Feb. 4, 1958  G. H. TRIPP  2,822,177
CHUCKS
Filed July 21, 1953  3 Sheets-Sheet 1

INVENTOR.
Guy H. Tripp
BY
Learman & Learman
ATTORNEYS

INVENTOR.
Guy H. Tripp
BY
Learman & Learman
ATTORNEYS

Feb. 4, 1958 G. H. TRIPP 2,822,177
CHUCKS
Filed July 21, 1953 3 Sheets-Sheet 3

INVENTOR.
Guy H. Tripp
BY
Learman & Learman
ATTORNEYS

United States Patent Office 2,822,177
Patented Feb. 4, 1958

2,822,177
CHUCKS
Guy H. Tripp, Bay City, Mich.
Application July 21, 1953, Serial No. 369,396
7 Claims. (Cl. 279—58)

This invention relates to chucks for gripping the shanks of drills, reamers, and related tools, and more particularly to a self-centering chuck which can be employed with tools having tapered shanks as well as with tools having cylindrical shanks.

One of the prime object of my invention is to design a chuck in which a plurality of circumferentially disposed jaws are adjustable radially and axially into gripping engagement with the shank of a tool.

Another object of the invention is to provide a chuck in which a plurality of circumferentially arranged gripping jaws are employed as levers to obtain a superior clamping action, which minimizes cutting vibration and precludes the possibility of the tool snapping out of the chuck during the cutting operation.

A further object of the invention is to provide a chuck of rugged and durable design which can be easily loaded and unloaded with very little effort in a minimum length of time.

Another object of the invention is to design a chuck which can be employed with tool shanks of varying size and which is well adapted for production operations of all kinds though not restricted thereto.

A further object of the invention is to design a chuck of simple and practical construction, which is comprised of an integral body having a minimum number of rugged operating parts which are self-centering and which will continue to clamp the tool or work in true axial alignment after long and sustained use.

Another object of the invention is to provide a chuck in which the full length of the elongated gripping jaws may be adjusted into clamping engagement with the tool or "work" if desired to provide gripping surfaces of large area over which the clamping forces are uniformly distributed.

A further object of the invention is to design a chuck in which lever-like gripping jaws are freely disposed within the chuck body and are movable angularly relative to the axis thereof to grip tapered shanks or workpieces.

Another object of the invention is to provide a chuck in which lever-like gripping jaws may be wedged into locked relation with the tools or workpieces.

A still further object of the invention is to design a chuck which can be very economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

The instant application is a continuation in part of an application entitled Super Grip Chucks, filed July 1, 1952 under Serial No. 296,669 and now abandoned, and Serial No. 293,105, filed June 12, 1952, and now issued as Patent No. 2,682,413.

Figure 1:
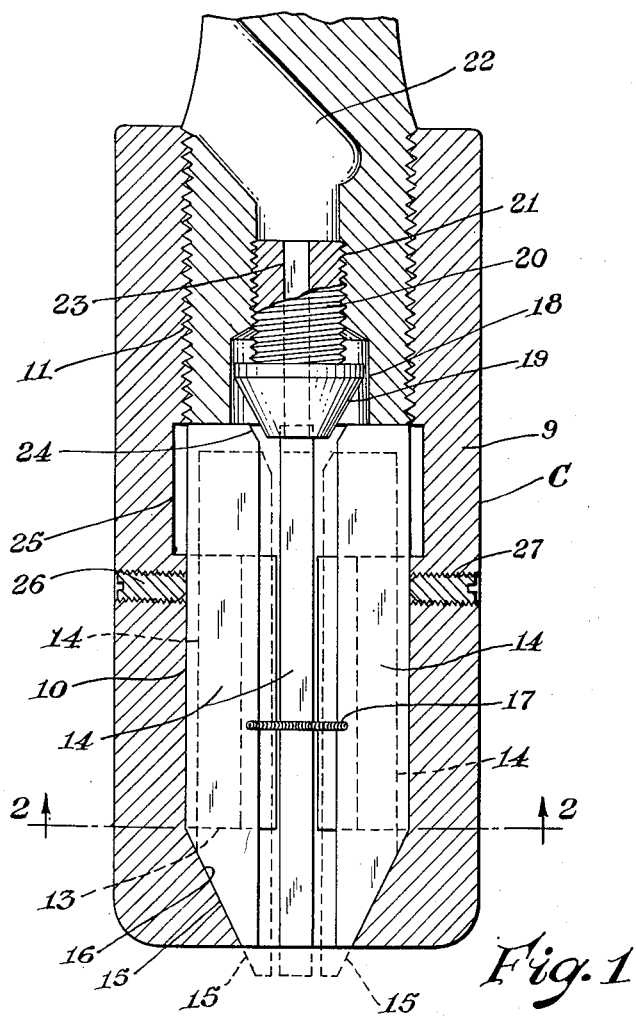
Fig. 1 is a sectional, elevational view taken through a chuck embodying the invention with the gripping jaws in open position, the broken lines indicating a clamping position of the gripping jaws.
Figure 2:
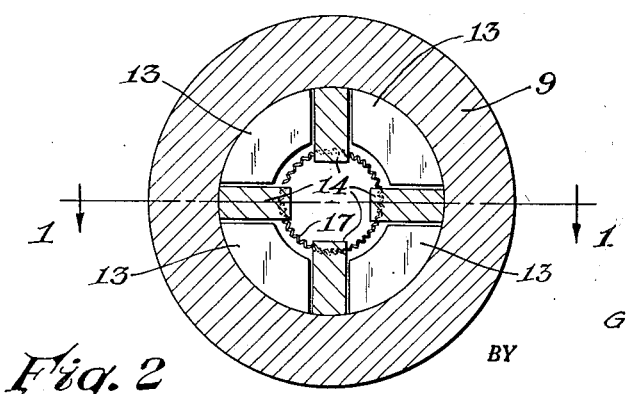
Fig. 2 is a transverse sectional view taken on the line 2—2 of Fig. 1.

Referring now to the accompanying drawings and more particularly to Figs. 1 and 2 thereof in which I have shown one of the preferred embodiments of my invention, a letter C generally indicates my chuck which comprises a hollow, cylindrical housing or body 9, the interior wall 10 of which is threaded as at 11 to accommodate a similarly threaded, tapered shank which can be fixed in the spindle of a drill press or related machine tool (not shown).

Integral guide ribs 13 are formed on the interior wall 10 at circumferentially spaced-apart points to freely receive elongated gripping jaws 14 therebetween, and it will be obvious that while in the instant application I have shown four gripping jaws, any number of jaws can be employed. The lower ends of the jaws 14 are beveled as at 15 to conform to the lower portion of the interior wall of the housing, which housing is inwardly tapered as at 16, and it will be seen that the jaws are normally retained in open position by an annular spring 17.

Provided in an enlarged opening 18 in the shank to actuate the jaws 14 is a frusto-conical nut 19 which has a threaded shank 20 operatively received in a threaded bore 21 communicating with the opening 18. An enlarged, inclined passage 22 communicates with the bore 21 to serve as an access opening for a nut adjusting universal tool (not shown). The shank 20 of the nut 19 is provided with a passage 23 of rectangular cross sectional configuration to receive the lower end of the tool of like cross section which is not shown, since it forms no part of the instant invention. The inner edges of the jaws 14 are beveled as at 24 to conform to the sloped wall of the nut 19, and it will be seen that the wall 11 is shouldered as at 25 to provide a working clearance between the inner ends of the jaws and the interior wall of the housing.

In operation, either the very end or the greater portion of the shank of a cutting tool (not shown) can be inserted between the jaws 14 as desired, and the nut 19 then adjusted axially to close the freely disposed jaws which are movable radially and axially into gripping relation. If only the end of the shank of a cutting tool is inserted, the inner ends of the jaws 14 are both moved axially and pivoted slightly about the wall 10 as a fulcrum upon actuation of the nut 19. The tapered wall 16 of the housing 10 cams the lower ends of the jaws 14 inwardly to provide an initial gripping action and the nut 19 moves the upper ends of the jaws slightly outwardly with the result that the jaws firmly clamp the end of the shank with the additional greater force obtained through the mechanical advantage gained by employing the jaws as levers. If the entire cylindrical shank of a cutting tool having such a shank is inserted, the movement of the jaws is primarily in an axial direction so that the jaws, when brought into gripping relation, are substantially parallel to the axis of the greater clamping surface. If the shank of the tool is tapered, the jaws are free to accommodate themselves to the slope thereof by moving both radially and axially upon adjustment. The wedging engagement of the conical surface of the nut 19 and the surfaces 24 of the jaws 14 securely lock the jaws in gripping relation until it is desired to release them.

Screws 26, adjustable in transversely disposed threaded openings 27 in the wall of the housing 10 adjacent the jaws 14, permit inward adjustment of the jaws. With this arrangement, the nut 19 can be backed out of engagement with the jaws 14 and then certain of the jaws can be adjusted inwardly beyond the axis of the housing so that when a tool is inserted and the remaining screws 26 adjusted to hold it, it will be retained off-center. It will be apparent that a chuck used in this manner would permit the drilling of off-center holes or could operatively support a boring tool.

Figure 3:
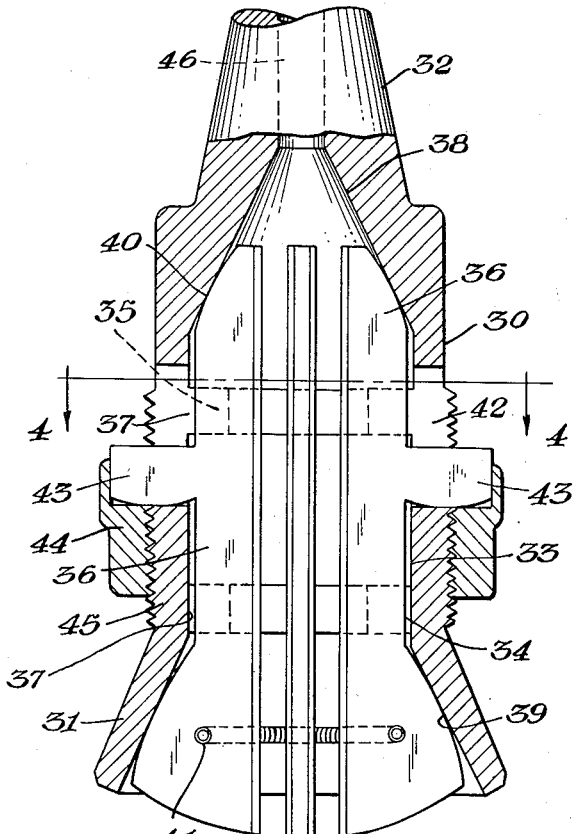
Fig. 3 is a sectional elevational view of a modified embodiment of the chuck shown in Fig. 1.
Figure 4:
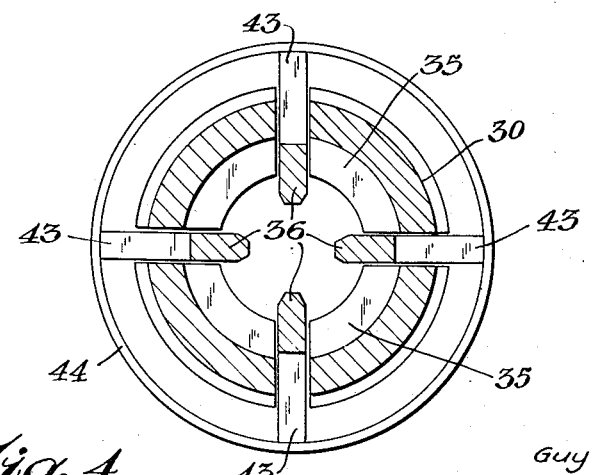
Fig. 4 is a transverse sectional view thereof taken on the line 4—4 of Fig. 3.

In Figs. 3 and 4 of the drawings, I have shown another embodiment of my invention in which the outer end of the hollow chuck housing 30 is outwardly flared as at 31, and the opposite end of the housing is formed with an integral tapered shank 32. The central portion of the interior wall 33 of the housing 30 is formed with circumferentially spaced-apart guide ribs 34 and 35 between which are freely received the chuck jaws 36. The jaws 36 bear against projections 37 which are provided to maintain a working clearance for said jaws, and the upper end of the interior wall 32 is tapered inwardly as at 38 as shown. The lower edges of the jaws 36 are curved outwardly as at 39 to cooperate with the flared wall 31 of the housing and the upper ends of the jaws 36 are curved inwardly as at 40 to cooperate with the tapered wall 38 of the housing, the jaws being held in open position by an annular spring 41 as previously. Elongated slots 42 of greater length than the width of the arms 43 formed on the jaws 36 intermediate their length adjustably accommodate the arms 43, and an adjusting collar 44 is threaded on the outer wall of the housing 30 as at 45, and bears against the lower face of the arms 43.

When the collar 44 is adjusted axially, the lower ends of the jaw 36 tend to be cammed inwardly, by the flared portion 31, toward the shank of a cutting tool (not shown), and the upper ends of the jaws are cammed inwardly by the wall 38. The jaws, in moving axially and radially into clamping engagement, are maintained in substantial parallelism with relation to the axis of the chuck.

Figure 5:
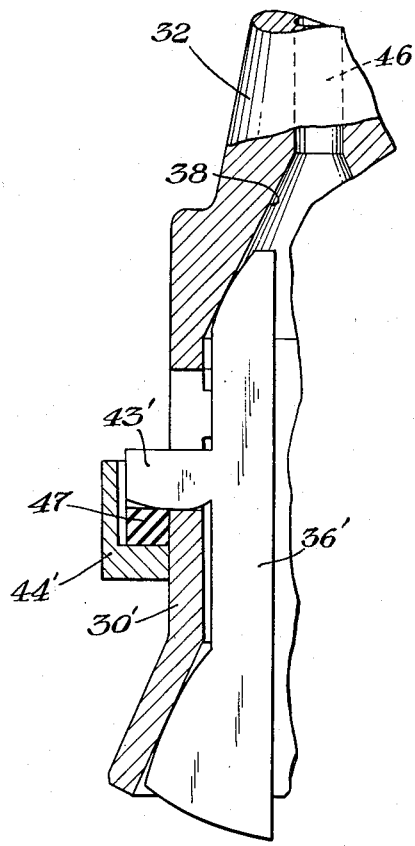
Fig. 5 is a view similar to Fig. 3 illustrating a modified means for locking the chuck in closed position.

A centrally disposed passage 46 may be provided in the shank 32 to admit bar or rod stock to the chuck if it is desired to employ the chuck in an automatic screw machine, and it will be apparent that if the chuck were to be used in this manner, the collar 44 would be adjusted by mechanical means in timed sequence. Such an arrangement is shown in Fig. 5 wherein the collar 44' is slidable on the outer wall of the chuck housing 30', a yielding rubber washer 47 of considerable thickness being provided between the collar 44' and arms 43' of the jaws 36'. The collar 44' is moved axially by mechanical means (not shown) to open and close the jaws automatically.

Figure 6:
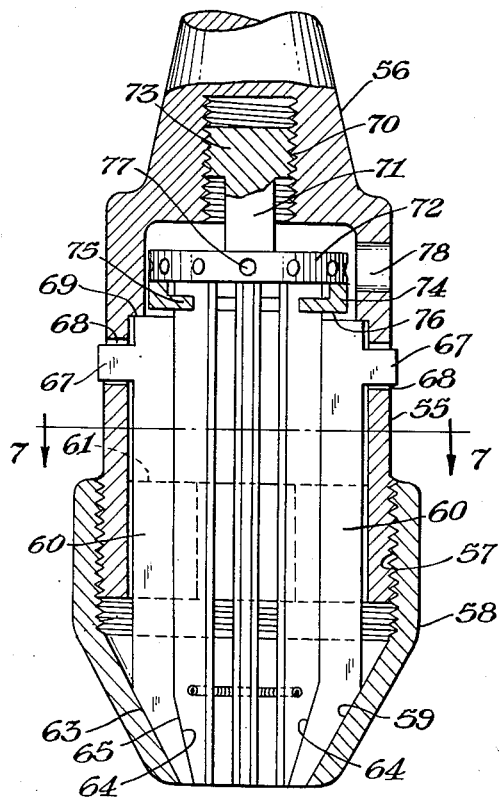
Fig. 6 is a sectional elevational view of another embodiment of the invention.
Figure 7:
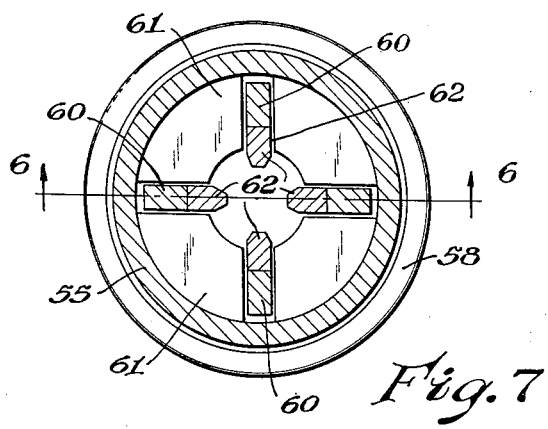
Fig. 7 is a transverse sectional view taken on the line 7—7 of Fig. 6.

In Figs. 6 and 7, I have shown still another embodiment of the invention in which the hollow chuck body 55 is cylindrical in shape and formed with an integral shank 56. The lower end of the body 55 is threaded as at 57 to receive a truncated, conical sleeve 58 which is provided with an inwardly tapering wall 59 as usual. Outer or main jaws 60 are provided between circumferentially disposed ribs 61, and inner auxiliary jaws 62 are secured thereto but are axially adjustable with respect to the jaws 60. The lower edges of the jaws 60 are sloped inwardly as at 63 to conform to the tapered wall 59, and the opposite faces thereof are sloped as at 64, the outer edges of the jaws 62 being sloped as at 65 to conform thereto.

The interior of the inwardly tapering wall 59 holds the ends of the jaws 60 a spaced distance from the interior wall of the chuck body 55 to provide a working clearance therebetween. The upper ends of the jaws 60 are provided with arms 67 carried in slots 68 formed in the body 55 and are adjustable slightly therein in a direction parallel to the vertical axis of the chuck. The interior wall of the body 55 is shouldered as at 69 to prevent upward movement of the jaws 60.

Provided in the upper end of the chuck is a reduced, threaded passage 70 in which is disposed the shank 71 of a nut 72, the upper end of the shank being enlarged and threaded as at 73. An operating ring 74, formed with an inwardly projecting flange 75, is provided on the nut 72 and engages in slots 76 provided in the upper ends of the inner jaws 62. A plurality of circumferentially spaced openings 77 are provided in the peripheral wall of the head of the nut 72, and a slotted opning 78 in the body 55 permits the entrance of a pin (not shown) which can be inserted in one of the openings 77 to actuate the nut and adjust the jaws 62 with relation to the main jaws 60.

In operation, the shank of the cutting tool (not shown) which has been inserted into the chuck, is initially gripped by adjusting the sleeve 58, thus camming the outer ends of the jaws 60 and 62 into clamping engagement, and adjustment of the nut 72 downwardly tends to force the inner jaws 62 downwardly and wedges them tightly into gripping relation. The jaws can be readily released, of course, by merely adjusting the nut 72 in the opposite direction.

In view of the foregoing, it will be apparent that I have perfected an extremely practical chuck which is capable of exerting a greater clamping force on the tool or work to be gripped. The chucks shown are obviously all adapted for automatic machine work, it being only necessary to provide a passage such as those in Figs. 3 and 5 to adapt them to receive bar stock.

While the chuck has been described as in upright position, it need not, of course, necessarily be used in upright position, and, accordingly, the terms "upper" and "lower" are employed for purposes of convenience of description only.

What I claim is:

1. In a chuck, a hollow body provided with a shank, a plurality of elongated jaws freely disposed in said body for axial and radial movement therein, means fixed with relation to the body for camming the lower ends of said jaws inwardly into gripping relation upon axial movement thereof, and means engaging the radially inner surfaces of said jaws adjacent the upper ends of the jaws for moving said jaws axially and pivoting the upper ends of said jaws radially outwardly to obtain a lever action therewith.

2. In a chuck, a unitary hollow body provided with a shank at one end and formed with integral tapering walls at the opposite end thereof, circumferentially spaced-apart guide ribs formed in said body, a plurality of axially and radially movable, elongated jaws freely disposed in said body between said ribs, the lower ends of said jaws being shaped to substantially conform to said tapering walls so as to be cammed inwardly when moved axially, and means radially inward of said jaws in engagement with the upper ends of said jaws for simultaneously moving said jaws axially and pivoting the upper ends of said jaws radially outwardly to obtain a lever action therewith.

3. In a chuck, a unitary cylindrical hollow body member provided with an inwardly tapered interior wall at its lower end, shank means for reception in the spindle of a machine tool on the opposite end of said member, circumferentially spaced-apart guide ribs formed on the interior wall of said member, axially and radially movable jaws disposed between said ribs and restrained from lateral movement thereby, the outer edges of the lower ends of said jaws being beveled to conform to the tapering wall of said body member, means for normally maintaining said jaws in outward open position, and wedge means radially inward of the jaws in engagement with the upper ends of said jaws, said wedge means being adjustable to pivot the upper ends of said jaws outwardly and thereby lever the lower ends thereof into locked gripping relation.

4. The combination defined in claim 3 in which the wall of said body member is shouldered to provide clearance between the upper ends of said jaws and said wall.

5. The combination defined in claim 3 in which said wedge means comprises a conical-shaped nut threaded in said shank means, the inner upper edges of said jaws being beveled to conform to the shape of said nut, said nut being engageable therewith to move said jaws radially and axially.

6. In a chuck for gripping the shank of a cutting tool, a hollow body member provided with shank means for reception in the spindle of a machine tool, circumferentially spaced-apart ribs formed in said body and extending inwardly from the wall thereof, a plurality of axially and radially movable, elongated jaws disposed in said body between said ribs and spaced radially from one another a predetermined distance, and means disposed in the body member between said guide ribs adjustable to move certain of said jaws substantially inwardly beyond the axis of said body and the remaining jaws into clamping engagement with said shank of the cutting tool to retain said cutting tool in off-center position.

7. In a chuck, a chuck body provided with means for supporting it, a plurality of elongated jaws freely disposed in said body for axial and radial movement therein, means fixed with relation to the body for camming the ends of said jaws into gripping relation upon axial movement thereof, and means engaging the radial surfaces of said jaws adjacent the opposite ends of the jaws for moving said jaws axially and pivoting the said opposite ends of said jaws radially in a direction opposite to the radial movement of the first mentioned ends of the jaws to obtain a lever action therewith.

References Cited in the file of this patent

UNITED STATES PATENTS

| | | |
|---|---|---|
| 131,829 | Pratt | Oct. 1, 1872 |
| 137,674 | Goodsell | Apr. 8, 1873 |
| 1,680,631 | Palaith | Aug. 14, 1928 |
| 1,930,022 | Tautz | Oct. 10, 1933 |
| 2,040,517 | Kopsch | May 12, 1936 |
| 2,670,214 | Fishwick | Feb. 23, 1954 |